Patented Aug. 10, 1954

2,686,170

UNITED STATES PATENT OFFICE 2,686,170

STABILIZATION OF VINYLIDENE CHLORIDE RESINS WITH 4-METHYL-UMBELLIFERONE BENZOATES

Chris E. Best, Franklin Township, Summit County, Ohio, assignor to The Firestone Tire & Rubber Company, Akron, Ohio, a corporation of Ohio No Drawing. Application August 13, 1952,
Serial No. 304,217

6 Claims. (Cl. 260—45.8)

This invention relates to the stabilization, against deterioration from light and atmospheric oxidation, of crystalline polymers and copolymers of vinylidene chloride.

The problem of compounding crystalline fiber-forming, vinylidene chloride polymers and copolymers, and specifically of stabilizing them against deterioration by light, is a difficult one, not heretofore solved to complete satisfaction. These resins are processed at rather elevated temperatures, at which most conventional stabilizers tend to decompose, and it is therefore difficult to obtain a light stabilizer which is both resistant to destruction by the processing conditions of vinylidene chloride resins, and effective in the final resin product.

Accordingly it is an object of this invention to provide novel and satisfactory light stabilizing agents for incorporation into vinylidene chloride resins.

Another object is to provide such light stabilizers which will not be adversely affected by the high temperatures of processing of crystalline vinylidene chloride resins.

Another object is to provide such stabilizers which will have a high degree of effectiveness.

A further object is to provide such stabilizers which will be non-toxic and non-allergenic.

SYNOPSIS OF THE INVENTION

The above and other objects are secured, in accordance with this invention, by the incorporation into a crystalline vinylidene chloride polymer or copolymer, of from about 0.5 to about 7.0% based on the weight of such polymer or copolymer, of a 4-methyl-umbelliferone benzoate having the formula

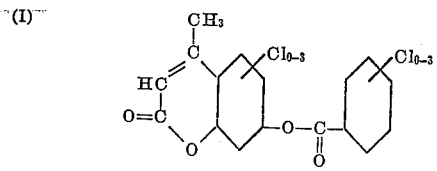

wherein Cl$_{0-3}$ in each occurrence indicates the attachment of 0, 1, 2 or 3 atoms of chlorine at any of the positions occupied by hydrogen in the unsubstituted aryl ring to which the associated bond line extends. The compositions containing the 4-methyl-umbelliferone benzoates of this invention are very effectively protected by the 4-methyl-umbelliferone benzoates against deterioration by exposure to light and weathering.

THE CRYSTALLINE VINYLIDENE CHLORIDE POLYMER AND COPOLYMERS

The resins forming the basis of the compositions of this invention are a well-known class of polymers of vinylidene chloride and copolymers thereof with not more than 15% of other unsaturated compounds copolymerizable therewith, and correspondingly containing at least 85% of vinylidene chloride copolymerized therein. Such resins are characterized by crystalline behavior, i. e. they fuse sharply to form relatively fluid melts which may be extruded, quenched and oriented to form strong filaments of crystalline character. A syndrome of this crystalline habit is the recalcitrance of these resins to compounding: the macromolecules of polyvinylidene chloride prefer contact with each other and tend to reject any foreign substances such as plasticisers, stabilizers and the like. It is therefore very difficult to provide suitable compounding agents for these resins, and specifically to provide mutually compatible stabilizing agents therefor.

As noted above, the base resin may be a homopolymer of vinylidene chloride, or a copolymer thereof with other unsaturated compounds, which copolymers must contain at least 85% of vinylidene chloride copolymerized therein. Suitable comonomers for this purpose include for example vinyl chloride, vinyl fluoride, vinyl acetate, styrene, acrylic and methacrylic esters such as methyl methacrylate, ethyl acrylate and the like, acrylonitrile, methacrylonitrile, vinyl ethers and ketones such as methyl vinyl ether, methyl vinyl ketone and related compounds such as methyl isopropenyl ketones and the like. For a more complete list of compounds known to copolymerize with vinylidene chloride see Krczil, "Kurzes Handbuch der Polymerisationstechnik," vol. II, "Mehrstoffpolymerization," Edwards Bros. Inc., p. 739, the items indented under "Vinylidene chloride."

THE 4-METHYL UMBELLIFERONE BENZOATES

A general Formula I is given above for the 4-methyl umbelliferone benzoates used as stabilizers in the practice of this invention. Compounds coming within this formula are exemplified in the following.

TABLE I

Unsubstituted 4-methyl-umbelliferone benzoate
4-methyl-umbelliferone 2,4-dichlorobenzoate
4-methyl-umbelliferone 4-chlorobenzoate 6,8-dichloro-4-methyl-umbelliferone benzoate
6,8-dichloro-4-methyl-umbelliferone 4 - chlorobenzoate
6,8-dichloro-4-methyl-umbelliferone 2,4-dichlorobenzoate The unsubstituted 4-methyl-umbelliferone benzoate was first prepared by Von-Pechmann and Duisberg Ber., 16, 2119 (1883). The various chloro-derivatives of this compound are for the most part novel; they may conveniently be prepared by esterifying 4-methyl-umbelliferone (or chlorinated 4-methyl-umbelliferone if the umbelliferyl radical is to contain chlorine) with benzoyl chloride (or a mono-, di- or trichlorobenzoyl chloride if the benzoyl radical is to contain chlorine) preferably in the presence of pyridine or other similar basic substance.

The 4-methyl-umbelliferone benzoates are incorporated into the vinylidene chloride resin compositions of this invention to the extent of from about 0.5 to 7.0%, preferably 1 to 3% based on the total weight of vinylidene chloride resin and 4-methyl-umbelliferone benzoates. The resultant compositions are highly resistant to deterioration by light and atmospheric action.

With the foregoing general discussion in mind, there are given herewith detailed examples of the practice of this invention. All parts given are by weight.

EXAMPLE

I. PREPARATION OF 4-METHYL-UMBELLIFERONE BENZOATES

With the exception of 4-methyl-umbelliferone benzoate itself, the compounds used are specifically novel. The 4-methyl-umbelliferone benzoate was prepared by the method of Von Pechmann and Duisberg, supra. The other compounds were prepared as follows:

A. *4-methyl-umbelliferone 2,4-dichlorobenzoate*

| | |
|---|---|
| 2,4-dichlorobenzoyl chloride | 20.95 grams (0.1 mole). |
| 4-methyl-umbelliferone | 17.60 grams (0.1 mole). |
| Toluene: | |
| First portion | 25 ml. |
| Second portion | 25 ml. |

The above ingredients, with the exception of the second portion of toluene, were placed in a flask provided with a reflux condenser and hydrogen chloride absorption train, and heat was applied until refluxing commenced. The materials did not wholly dissolve, and the second portion of toluene was added; however, even upon continued refluxing, complete solution was not effected. The refluxing was continued for a total of 18 hours, during which time the reaction mass assumed successively gray, reddish violet and finally deep purple colorations. The reaction mass was cooled, agitated with cold water in a Waring Blendor, filtered and the filter cake dried in a forced draft oven at 40° C. The dried material was dissolved in hot benzene and crystallized therefrom as a fine white powder, m. 195.0–195.2° C. yield 18.0 grams. This was taken as substantially pure beta - methyl - umbelliferone 2,4 - dichlorobenzoate.

B. *4-methyl-umbelliferone p-chlorobenzoate*

| | |
|---|---|
| 4-methyl-umbelliferone | 17.6 grams (0.1 mole). |
| p-chlorobenzoyl chloride | 17.5 grams (0.1 mole). |
| Toluene | 50 grams. |

The above ingredients were charged into a flask provided with a reflux condenser and hydrogen chloride absorption train, and heated to reflux for 18 hours. The reactants did not go into complete solution at any time during the refluxing. The reaction mass was cooled and agitated with cold water in a Waring Blendor, and then filtered. The filter cake was dried at 40° C. in a forced draft oven. The dried cake was dissolved in one liter of hot benzene, and the hot solution agitated with decolorizing carbon and filtered. The filtrate, which was a clear straw color, was evaporated down to a volume of one liter, and cooled, whereupon white crystals separated out. The crystals were separated by filtration and dried at 40° C. in a forced draft oven, yielding 8.6 grams of product, m. 163.7–164.8° C.

C. *Mixed 3,6,8 - trichloro- and 6,8 - dichloro - 4-methyl-umbelliferone benzoates*

(1) *Preparation of chlorinated 4-methyl-umbelliferones*

| | |
|---|---|
| 4-methyl-umbelliferone | grams 100 |
| Glacial acetic acid: | |
| First portion | ml 400 |
| Second portion | ml 200 |

The 4-methyl-umbelliferone and first portion of glacial acetic acid were charged into a one-liter flask and heated to 110° C., resulting in complete solution. Chlorine was passed in rapidly and the temperature gradually lowered to 80° C. at which time a solid separated out. At the end of 90 minutes, the second portion of glacial acetic acid was added, and introduction of chlorine continued. Heat was applied to raise the temperature to 80° C., but after discontinuance of the heating, the temperature fell to 60° C., whereupon a large quantity of a yellow precipitate separated. The mass was cooled to 25° C. filtered, and the precipitate washed twice with water by slurrying in a Waring Blendor and refiltration. The washed precipitate was dried in an oven at 90° C., yielding a creamy white solid melting at 258° C. Fries and Lindeman, Ann. 404, 64 (1914), report melting point of 240° C. and 268° C. for 6,8-dichloro- and 3,6,8-trichloro-4-methyl-umbelliferone respectively, and it appears that the present preparation is a mixture of these substances.

(2) *Esterification*

| | |
|---|---|
| Chlorinated 4-methyl-umbelliferones (prepared as just described) | g 12.25 |
| Benzoyl chloride | g 7.03 |
| Pyridine | ml 25 |

The above ingredients were stirred together, whereupon reaction immediately set in, giving a red-black colored crystalline product. The product was dissolved in benzene, and the solution washed in a separatory funnel with water and treated twice with decolorizing carbon. The product was crystallized from the benzene solution and had a melting point of 198.0–198.8° C.

D. *Mixed 3,6,8 - trichloro- and 6,8 - dichloro - 4-methyl-umbelliferone p-chlorobenzoates*

| | |
|---|---|
| Mixed chlorinated 4-methyl-umbelliferone (prepared as described at C–(1) above) | 12.5 g. (.05 mole). |
| p-Chlorobenzoyl chloride | 8.8 g. (.05). |
| Pyridine | 25 ml. |

The above ingredients were reacted together and worked up as described at C–(2) above. The product, amounting to 6.4 grams, melted at 198–198.8° C.

II. COMPOUNDING AND TESTING

| | Parts |
|---|---|
| Copolymer of 85% vinylidene chloride, 15% vinyl chloride | 10 |
| Di-n-propyl tetrachlorophthalate | 0.45 |
| Glycidyl phenyl ether | 0.2 |
| 4-methyl-umbelliferone benzoate compound under test | 0.2 |

A series of test specimens was made up in accordance with the foregoing recipe, using the several 4-methyl-umbelliferone benzoate compounds prepared as above described in the several specimens. In each case the selected 4-methyl-umbelliferone compound and the other ingredients in the proportions listed in the recipe were slurried with acetone and dried with stirring until the mass was pulverulent. The mass was then spread out to dry for 24 hours, at the end of which time the odor of acetone was no longer detectable.

A one-gram sample of each such composition was placed between cellophane sheets and pressed in a flat platen laboratory press under a total load of 1000 pounds at a temperature of 180° C. yielding a plaque approximately 6–8 mils thick. Light ageing tests were conducted on specimens cut from each plaque as follows.

*Sunlamp test.*—ASTM Test D620–45T.

*Weatherometer.*—Specimens of the plaques were exposed in a Standard X-1-A weatherometer, using a Corex O filter and operating without the sprays.

Tabulated herewith are the stabilizers used, and the appearance of the test specimens.

TABLE II

| Stabilizer Used | 100 hrs. Sunlamp Exposure (ASTM D-620–45T) | Appearance of Specimens after Weatherometer Exposure for | |
|---|---|---|---|
| | | 100 hrs. | 200 hrs. |
| 4-Methyl-umbelliferone benzoate | off-white | pale brown | very light brown. |
| 4-Methyl-umbelliferone 2,4-dichlorobenzoate. | do | faint brown | light brown. |
| 4-Methyl-umbelliferone p-chlorobenzoate | pale straw | very light brown | Do. |
| Mixed 3,6,8-trichloro- and 6,8-dichloro-4-methyl-umbelliferone benzoates (prepared as described at C above). | off-white | light brown | brown. |
| Mixed 3,6,8-trichloro- and 6,8-dichloro-4-methyl-umbelliferone p-chloro-benzoates (prepared as described at D above). | do | do | Do. |
| Blank | dark brown | very dark brown | black. |

From the foregoing general discussion and detailed specific examples, it will be evident that this invention provides novel crystalline vinylidene chloride resin compositions having outstanding resistance to deterioration by the action of light. The 4-methyl-umbelliferone benzoates are readily and cheaply available from domestic sources.

What is claimed is:

1. A light-stable, crystalline, vinylidene chloride resin composition comprising a resin selected from the group consisting of polymers of vinylidene chloride and copolymers thereof with up to 15%, based on the weight of said copolymers, or other unsaturated compounds copolymerizable therewith, together with from 0.5 to 7.0%, based on the weight of said selected resin, of a compound of the formula

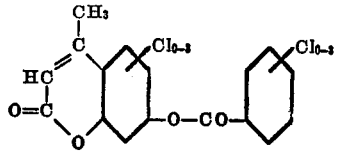

wherein the notation $Cl_{0-3}$ indicates attachment of up to 3 chlorine atoms to the aromatic ring associated therewith at the positions occupied by hydrogen in the unsubstituted compound.

2. A light-stable, crystalline, vinylidene chloride resin composition comprising a resin selected from the group consisting of polymers of vinylidene chloride and copolymers thereof with up to 15%, based on the weight of said copolymers, of other unsaturated compounds copolymerizable therewith, together with from 1 to 3%, based on the weight of said selected resin, of 4-methyl-umbelliferone benzoate.

3. A light-stable, crystalline, vinylidene chloride resin composition comprising a resin selected from the group consisting of polymers of vinylidene chloride and copolymers thereof with up to 15%, based on the weight of said copolymers, of other unsaturated compounds copolymerizable therewith, together with from 1–3%, based on the weight of said selected resin, of 4-methyl-umbelliferone 2,4-dichlorobenzoate.

4. A light-stable, crystalline, vinylidene chloride resin composition comprising a resin selected from the group consisting of polymers of vinylidene chloride and copolymers thereof with up to 15%, based on the weight of said copolymers, of other unsaturated compounds copolymerizable therewith, together with from 1 to 3%, based on the weight of said selected resin, 4-methyl-umbelliferone p-chlorobenzoate.

5. A light-stable, crystalline, vinylidene chloride resin composition comprising a resin selected from the group consisting of polymers of vinylidene chloride and copolymers thereof with up to 15%, based on the weight of said copolymers, of other unsaturated compounds copolymerizable therewith, together with from 1 to 3%, based on the weight of said selected resin, 6,8-dichloro-4-methyl-umbelliferone benzoate.

6. A light-stable, crystalline, vinylidene chloride resin composition comprising a resin selected from the group consisting of polymers of vinylidene chloride and copolymers thereof with up to 15%, based on the weight of said copolymers, of other unsaturated compounds copolymerizable therewith, together with from 1 to 3%, based on the weight of said selected resin, 6,8-dichloro-4-methyl-umbelliferone p-chlorobenzoate.

References Cited in the file of this patent

Limaye: Berichte 67B, pages 12–15, 1934. Cited in Chem. Abs. 28, 16843, 1934.

Giese et al.: J. Am. Pharm. Assn. Sci. Ed., January 1950, page 31.